United States Patent
Tateishi et al.

(10) Patent No.: US 11,391,625 B2
(45) Date of Patent: Jul. 19, 2022

(54) ELEMENT FOR OSCILLATING OR DETECTING AN ELECTROMAGNETIC WAVE AND ELEMENT MANUFACTURING METHOD

(71) Applicant: CANON KABUSHIKI KAISHA, Tokyo (JP)

(72) Inventors: Yoshinori Tateishi, Naka-gun (JP); Shinichiro Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 16/549,783

(22) Filed: Aug. 23, 2019

(65) Prior Publication Data
US 2020/0072663 A1 Mar. 5, 2020

(30) Foreign Application Priority Data
Aug. 30, 2018 (JP) .............................. JP2018-161424

(51) Int. Cl.
| | |
|---|---|
| *G01J 1/42* | (2006.01) |
| *H01Q 7/00* | (2006.01) |
| *H01Q 1/36* | (2006.01) |
| *H01Q 23/00* | (2006.01) |
| *H01Q 9/04* | (2006.01) |
| *G01J 5/10* | (2006.01) |
| *H01Q 1/22* | (2006.01) |
| *G01N 21/3581* | (2014.01) |
| *G01J 5/00* | (2022.01) |

(52) U.S. Cl.
CPC . *G01J 1/42* (2013.01); *G01J 5/10* (2013.01); *G01N 21/3581* (2013.01); *H01Q 1/2283* (2013.01); *H01Q 1/36* (2013.01); *H01Q 7/00* (2013.01); *H01Q 9/0464* (2013.01); *H01Q 23/00* (2013.01); *G01J 2005/0077* (2013.01)

(58) Field of Classification Search
CPC ........ G01J 1/42; G01J 5/10; G01J 2005/0077; G01N 21/3581; H01Q 1/2283; H01Q 1/36; H01Q 7/00; H01Q 9/0464; H01Q 23/00; H01Q 1/248
See application file for complete search history.

(56) References Cited

U.S. PATENT DOCUMENTS

| | | |
|---|---|---|
| 2013/0051181 A1 | 2/2013 | Fujisawa |
| 2014/0321248 A1 | 10/2014 | Fujisawa |
| 2017/0059402 A1* | 3/2017 | Debray ................ G01J 3/42 |

FOREIGN PATENT DOCUMENTS

JP 2017-044696 A 3/2017

* cited by examiner

*Primary Examiner* — David P Porta
*Assistant Examiner* — Meenakshi S Sahu
(74) *Attorney, Agent, or Firm* — Venable LLP

(57) ABSTRACT

An element configured to oscillate or detect an electromagnetic wave, the element comprising: a first dielectric portion having cylindrical shape and including a loop antenna on a first end surface thereof; a second dielectric portion connected to a second end surface of the first dielectric portion which is different from the first end surface; and an electrode portion which is disposed between the second dielectric portion and a substrate and is configured to reflect the electromagnetic wave.

14 Claims, 12 Drawing Sheets

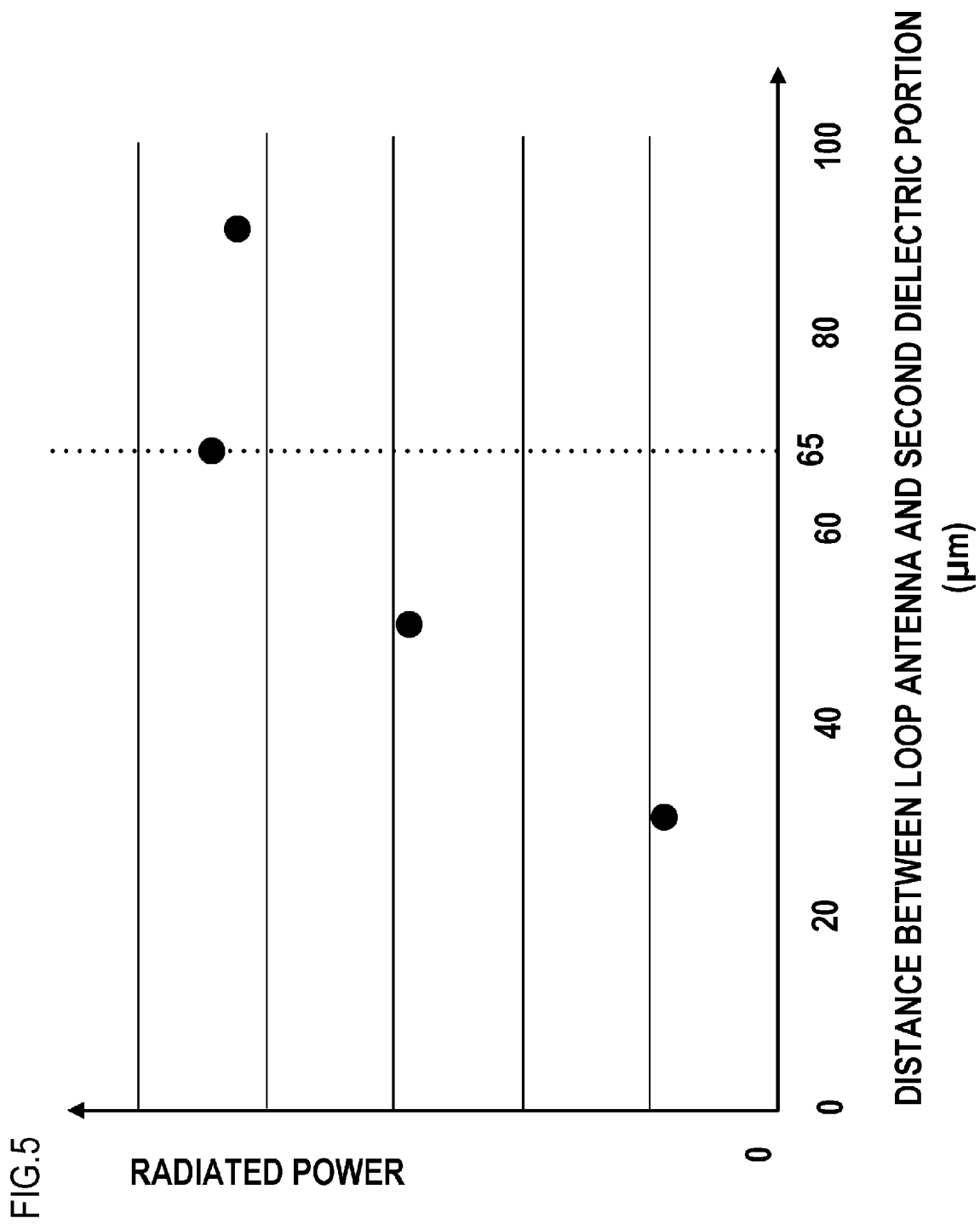

ELEMENT FOR OSCILLATING OR DETECTING AN ELECTROMAGNETIC WAVE AND ELEMENT MANUFACTURING METHOD

BACKGROUND OF THE INVENTION

Field of the Invention

The present invention relates to an element for oscillating or detecting an electromagnetic wave and an element manufacturing method.

Description of the Related Art

A terahertz wave is an electromagnetic wave (a radio wave) having a certain frequency band that ranges from the millimeter wave region to the terahertz wave region (from 30 GHz to 30 THz). In an image forming apparatus (an imaging apparatus), by arranging electromagnetic wave sensors capable of detecting such terahertz waves in an array and disposing a focus lens in front of the electromagnetic wave sensor array, an image can be acquired in the terahertz wave region. In addition, image acquisition in the terahertz wave region is useful in various fields. For example, since terahertz waves pass through cloth, fabric, and the like but do not readily pass through metal, image forming apparatuses using terahertz waves are useful in the field of security for purposes such as finding hidden weapons. Image forming apparatuses using terahertz waves are also useful in the field of medicine. For example, since refractive indices with respect to terahertz waves differ between cancer tissue and healthy tissue, image formation of a body tissue in the terahertz wave region is useful for detecting a cancer cell of a patient.

In addition, it is common practice to integrate several hundred sensors on a single semiconductor substrate. In this case, with image formation (imaging) using a sensor array, it is important to ensure that information to be detected by a sensor at a prescribed position is not detected by sensors at other positions. This is because information that should not be detected causes an image not intended by a user to be acquired. Furthermore, a dielectric constant of a semiconductor is normally larger than a dielectric constant of air that surrounds a sensor. As a result, received and radiated energy related to an antenna of sensors integrated on a semiconductor substrate tends to have a higher propagation rate through the substrate than through air. In addition, since a semiconductor substrate normally has a flat plate shape, energy propagating through the substrate assumes a substrate mode or, in other words, a resonant mode, and a situation arises where energy propagation with respect to the sensors differs from what was intended. Furthermore, such situations are likely to cause a distortion in acquired images. In order to cope with such situations, Japanese Patent Application Laid-open No. 2017-44696 discloses a detecting element (an electromagnetic wave detecting/generating apparatus) which reduces propagation of an electromagnetic wave into a substrate using a reflective plate provided on an inner wall of a depressed portion below an antenna.

SUMMARY OF THE INVENTION

However, in Japanese Patent Application Laid-open No. 2017-44696, since a depressed portion is formed and the antenna must be installed on the depressed portion, a method of supporting the antenna is required. In other words, in Japanese Patent Application Laid-open No. 2017-44696, the depressed portion must be filled with resin or the like in order to hold the antenna. However, since there is a difference between a coefficient of linear expansion of the resin and a coefficient of linear expansion of the substrate and a crack may occur between the resin and the substrate, it is not easy to form the element (the detecting element) according to Japanese Patent Application Laid-open No. 2017-44696.

In consideration of the above state, an object of the present invention is to provide an element which is capable of reducing propagation of an electromagnetic wave into a substrate and which can be formed by a simple method.

A first aspect of the present invention is an element configured to oscillate or detect an electromagnetic wave, the element comprising:

a first dielectric portion having cylindrical shape and including a loop antenna on a first end surface thereof;

a second dielectric portion connected to a second end surface of the first dielectric portion which is different from the first end surface; and an electrode portion which is disposed between the second dielectric portion and a substrate and is configured to reflect the electromagnetic wave.

A second aspect of the present invention is a manufacturing method of an element for oscillating or detecting an electromagnetic wave, the manufacturing method comprising:

a step of fabricating an electron element on a first surface of a semiconductor substrate;

a step of forming an electrode portion on a second surface of the semiconductor substrate, the second surface being an opposite surface to the first surface;

a step of bonding a substrate that differs from the semiconductor substrate onto a surface of the electrode portion, the surface being opposite to a surface bonded to the semiconductor substrate;

a step of forming, on the first surface of the semiconductor substrate, a loop antenna that is to be electrically connected to the electron element; and a step of forming, by etching the semiconductor substrate, a first dielectric portion having cylindrical shape and including the loop antenna on a first end surface and a second dielectric portion connected to a second end surface of the first dielectric portion which is different from the first end surface.

According to the present invention, an element which is capable of reducing propagation of an electromagnetic wave into a substrate and which can be formed by a simple method can be provided.

Further features of the present invention will become apparent from the following description of exemplary embodiments with reference to the attached drawings.

BRIEF DESCRIPTION OF THE DRAWINGS

FIG. 5 is a diagram showing a variation in radiated power according to the first modification embodiment;

DESCRIPTION OF THE EMBODIMENTS

Conventionally, several operating principles of detecting elements (detecting devices) which detect an electromagnetic wave in the terahertz region have been proposed. In one principle, an electromagnetic wave propagating through a medium (such as air) which surrounds a detecting element are collected by an antenna and a signal in a high frequency region is converted into a signal in a low frequency region by an electron element including a rectifying element. The low frequency signal can be readily handled by a general electron element. In addition, a Schottky barrier diode (SBD), a plasmon-type field-effect transistor (FET), or the like can be used as the rectifying element in the terahertz region.

Since an electron element including a rectifying element such as a Schottky barrier diode is formed on a silicon substrate or the like, the antenna must also be formed on the silicon substrate. However, when providing the antenna in contact with the silicon substrate having a larger dielectric constant than a medium (normally, air or vacuum) surrounding the antenna, a directionality of the antenna ends up being oriented in a direction of the silicon substrate with a high dielectric constant. For example, when considering radiation of an electromagnetic wave, a large portion of energy amount radiated from the antenna ends up being radiated into the silicon substrate. As a method of controlling the directionality of the antenna, Japanese Patent Application Laid-open No. 2017-44696 proposes a method of installing a reflective plate between the antenna and the silicon substrate. With this method, installing the reflective plate requires a cumbersome and complicated process of forming a depressed portion on the substrate and subsequently backfilling the depressed portion with a resin or the like. Furthermore, since there is a large difference in coefficients of thermal expansion between the resin and the substrate, there is a problem in that a crack occurs between the substrate and the resin. In consideration thereof, hereinafter, a structure of an element which controls directionality of an antenna without the need for a resin backfill process and which can be simply (readily) formed (manufactured; generated) will be described.

First Embodiment

Figure 1A:
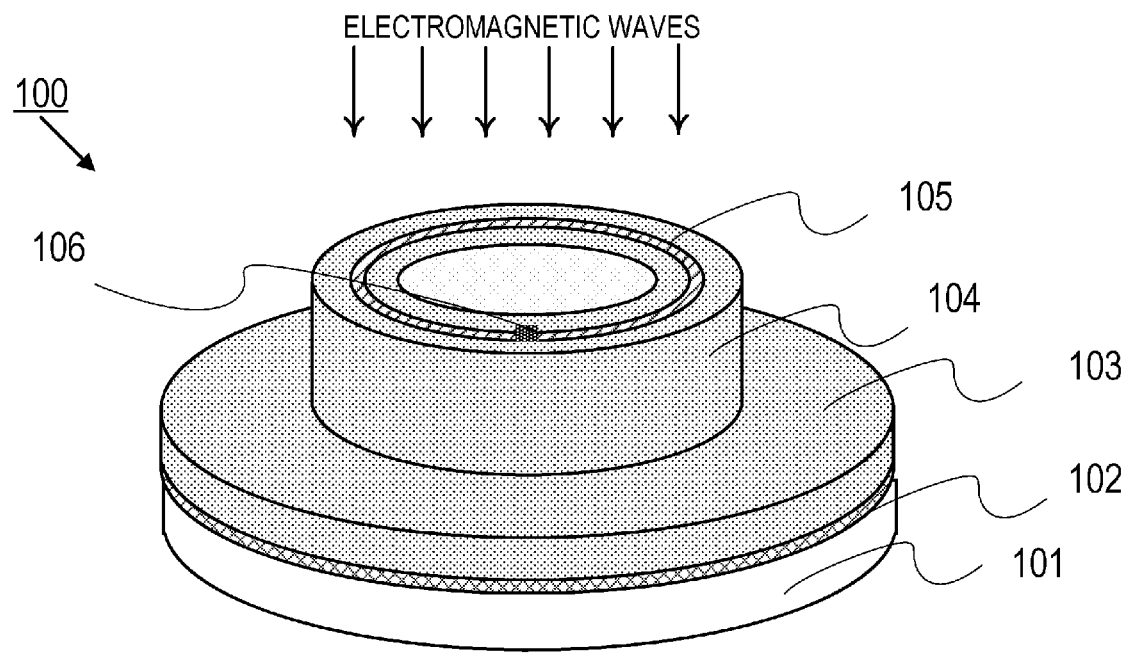
FIGS. 1A and 1B are diagrams each showing a detecting element according to a first embodiment.
Figure 1B:
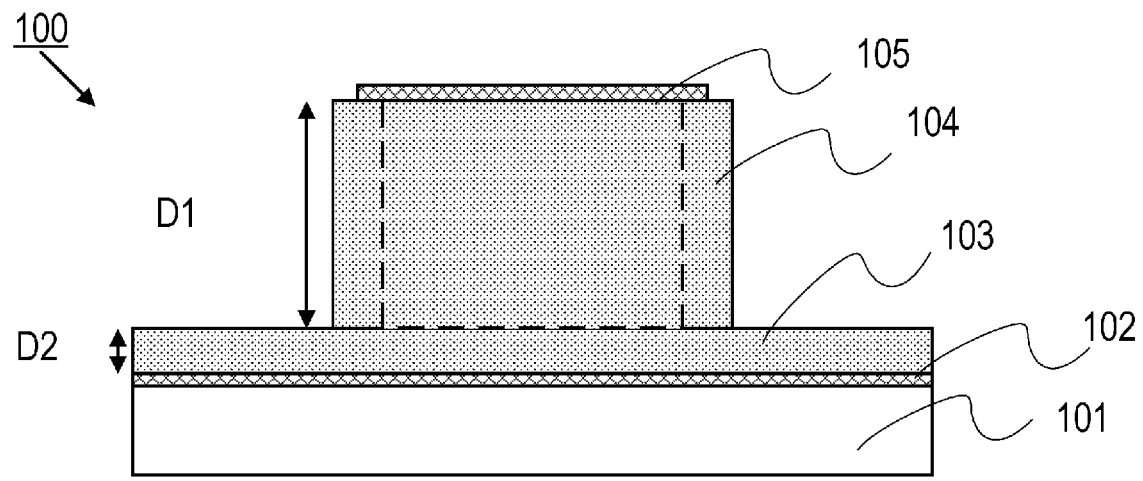

Hereinafter, a detecting element 100 (an electromagnetic wave detecting/generating apparatus) according to a first embodiment which detects an electromagnetic wave in the terahertz region will be described with reference to FIGS. 1A and 1B. FIG. 1A is a bird's eye view showing an external appearance of the detecting element 100. FIG. 1B is a perspective view of the detecting element 100 from a direction parallel to a substrate 101.

The detecting element 100 according to the present embodiment is constituted by the substrate 101, an electrode portion 102, a dielectric portion 103, a cylindrical dielectric portion 104, a loop antenna 105, and an electron element 106. In this case, as shown in FIG. 1A, an electromagnetic wave detected by the detecting element 100 is incident to a plane of the loop antenna 105 from a direction which is perpendicular to the plane and which is opposite to an arrangement direction of the substrate 101. In the following description, the direction (direction of incidence) along which the electromagnetic wave is incident will be referred to as "the top". Therefore, when the direction of incidence of the electromagnetic wave is "the top", the loop antenna 105 and the electron element 106, the cylindrical dielectric portion 104, the dielectric portion 103, the electrode portion 102, and the substrate 101 are arranged in this order from above in the detecting element 100.

The electron element 106 is an electronic circuit including a rectifying element such as a Schottky barrier diode which converts a signal (an electromagnetic wave) with a frequency in the terahertz region into a signal in a lower frequency region than the frequency in the terahertz region. The Schottky barrier diode can be fabricated using various semiconductors including silicon and III-V semiconductor materials.

The loop antenna 105 is electrically connected to the electron element 106 and receives an electromagnetic wave incident to the detecting element 100. While the loop antenna 105 has a circular loop shape in the present embodiment, various loop shapes such as a square shape and a triangular shape may be used instead. A length (a total length) of the loop antenna 105 is set so that the loop antenna 105 can resonate at an anti-resonant frequency at an operating frequency. For example, the length of the loop antenna 105 is 3/2 times a wavelength (a resonance wavelength) $\lambda_0$ of an electromagnetic wave that resonates in the loop antenna 105. It should be noted that the resonance wavelength $\lambda_0$ of the loop antenna 105 is also a wavelength of an electromagnetic wave received by the loop antenna 105 when propagating through the loop antenna 105 as well as a wavelength of a current inside the loop antenna 105. In this case, the resonance wavelength $\lambda_0$ of the loop antenna 105 can be determined on the basis of a wavelength of an electromagnetic wave propagating through a silicon substrate or the like.

In addition, the wavelength of an electromagnetic wave propagating through a silicon substrate is dependent on a frequency of the electromagnetic wave and a dielectric constant of a material of the silicon substrate. In the present embodiment, an insulating film or the like is formed on the cylindrical dielectric portion 104 which is a silicon substrate. For example, silicon dioxide or silicon nitride can be used as the insulating film. Therefore, the resonance wavelength $\lambda_0$ of the loop antenna 105 is defined by a composite dielectric constant of the silicon substrate, an insulator, and the like which surround the loop antenna 105. Furthermore, in the present embodiment, seams are present in the loop of the loop antenna 105 and a part of the loop is disconnected.

The dielectric portion 103 and the cylindrical dielectric portion 104 are formed by machining a silicon substrate or the like on which the electron element 106 and the loop antenna 105 are integrated. Specifically, the dielectric portion 103 and the cylindrical dielectric portion 104 are semiconductors made of Si, GaAs, or InP. It should be noted that, while the dielectric portion 103 and the cylindrical dielectric portion 104 are assumed to be made of a same material in the present embodiment, the dielectric portion 103 and the cylindrical dielectric portion 104 may be made of different materials instead. Specifically, in the present embodiment, the dielectric portion 103 and the cylindrical dielectric portion 104 are formed by machining one silicon substrate. In other words, in the present embodiment, the dielectric portion 103 and the cylindrical dielectric portion 104 can also be described as a single dielectric body. The dielectric portion 103 is a dielectric body formed between the cylindrical dielectric portion 104 and the electrode portion 102. It should be noted that, while the dielectric portion 103 is formed in a columnar shape in the present embodiment, the dielectric portion 103 is not limited thereto and may have any shape such as a cuboid shape or a polygonal column shape in accordance with the substrate 101 and the electrode portion 102.

The cylindrical dielectric portion 104 is a dielectric body with a cylindrical structure which is formed under the loop antenna 105 via an insulating film. Specifically, of the cylindrical dielectric portion 104, an upper end surface is connected to the loop antenna 105 and a lower end surface that is opposite to the upper end surface is connected to the dielectric portion 103. Therefore, in the present embodiment, the cylindrical dielectric portion 104 can be described as having the loop antenna 105 and the electron element 106 on one end surface thereof. The cylindrical structure of the cylindrical dielectric portion 104 has a wave-guiding effect of propagating electromagnetic waves collected in the loop antenna 105 and guiding the collected electromagnetic waves to the electrode portion 102. For this reason, the cylindrical dielectric portion 104 is desirably made of a material that sufficiently transmits a desired electromagnetic wave. For example, silicon or a III-V semiconductor with high resistance is suitably used. In addition, in order to impart a wave-guiding effect of electromagnetic waves to the cylindrical dielectric portion 104, a material such as air or silicon dioxide of which a refractive index is sufficiently smaller than a refractive index of the cylindrical dielectric portion 104 is desirably used as a medium that surrounds the cylindrical dielectric portion 104. In addition, the cylindrical dielectric portion 104 is capable of shaping a radiation pattern of the loop antenna 105 with its cylindrical structure. While the cylindrical dielectric portion 104 has a cylindrical structure in the present embodiment, the cylindrical dielectric portion 104 may have any shape as long as a structure thereof is closed.

The electrode portion 102 is a reflective plate which, by reflecting a part of an incident electromagnetic wave, causes the electromagnetic wave to once again propagate through the cylindrical dielectric portion 104 and radiate outward. The electrode portion 102 is disposed between the dielectric portion 103 and the substrate 101. In a case where, for example, a thickness (height) D1 of the cylindrical dielectric portion 104 is short and less than $\lambda_0/8$ and a thickness (height) D2 of the dielectric portion 103 is thicker than $\lambda_0/8$, so-called crosstalk where an electromagnetic wave propagates in the dielectric portion 103 and affect adjacent elements is likely to occur. Therefore, desirably, the thickness D1 of the cylindrical dielectric portion 104 is sufficiently long and equal to or more than $\lambda_0/8$ (equal to or more than ⅛ of $\lambda_0$) and the thickness D2 of the dielectric portion 103 is sufficiently thin and equal to or less than $\lambda_0/8$ (equal to or less than ⅛ of $\lambda_0$). It should be noted that, as shown in FIG. 1B, the thickness D1 of the cylindrical dielectric portion 104 and the thickness D2 of the dielectric portion 103 respectively indicate lengths of the cylindrical dielectric portion 104 and the dielectric portion 103 in a vertical direction. In addition, while the electrode portion 102 is formed in a circular shape (a thin columnar shape) in the present embodiment, the electrode portion 102 may have any shape such as a rectangular or polygonal shape as long as the electrode portion 102 is capable of interrupting propagation of an electromagnetic wave to the substrate 101. In the present embodiment, the thickness D2 of the dielectric portion 103 can be described as a distance (a shortest distance) between the cylindrical dielectric portion 104 and the electrode portion 102.

In addition, as described above, conditions requiring that the thickness D1 of the cylindrical dielectric portion 104 be set to $\lambda_0/8$ or more and the thickness D2 of the dielectric portion 103 be set to $\lambda_0/8$ or less demonstrate that a distance denoted by D1+D2 between the loop antenna 105 and the electrode portion 102 is desirably $\lambda_0/8$ or more. Furthermore, the loop antenna 105 is desirably installed while being separated from the electrode portion 102 by around $\lambda_0/4$ (¼ of $\lambda_0$) so that an electromagnetic wave reflected by the electrode portion 102 and a directly-incident electromagnetic wave become in-phase at the loop antenna 105. In other words, a total thickness D of the thickness D1 of the cylindrical dielectric portion 104 and the thickness D2 of the dielectric portion 103 is preferably set to around $\lambda_0/4$. It should be noted that an input impedance with the electron element 106 can be adjusted on the basis of the total thickness D of the thickness D1 of the cylindrical dielectric portion 104 and the thickness D2 of the dielectric portion 103, a sectional area of the loop antenna 105, or the like.

In the present embodiment, a detecting element can be generated by configuring the electrode portion 102, the dielectric portion 103, the cylindrical dielectric portion 104, and the loop antenna 105 on the substrate 101, and since a process such as back-filling by resin is not performed, the detecting element can be readily formed. In addition, since an electromagnetic wave can be reflected by the electrode portion 102 and a radiation pattern of the loop antenna 105 can be shaped by the cylindrical structure of the cylindrical dielectric portion 104, propagation of an electromagnetic wave into the substrate 101 can be reduced.

Regarding D1 and D2

Hereinafter, an effect of the thickness D1 of the cylindrical dielectric portion 104 and the thickness D2 of the dielectric portion 103 of the detecting element 100 according to the present embodiment on the loop antenna 105 will be described using specific numerical values. In the following description, it is assumed that a frequency of an electromagnetic wave is 500 GHz and the resonance wavelength $\lambda_0$ of the loop antenna 105 is 260 μm.

Figure 2:
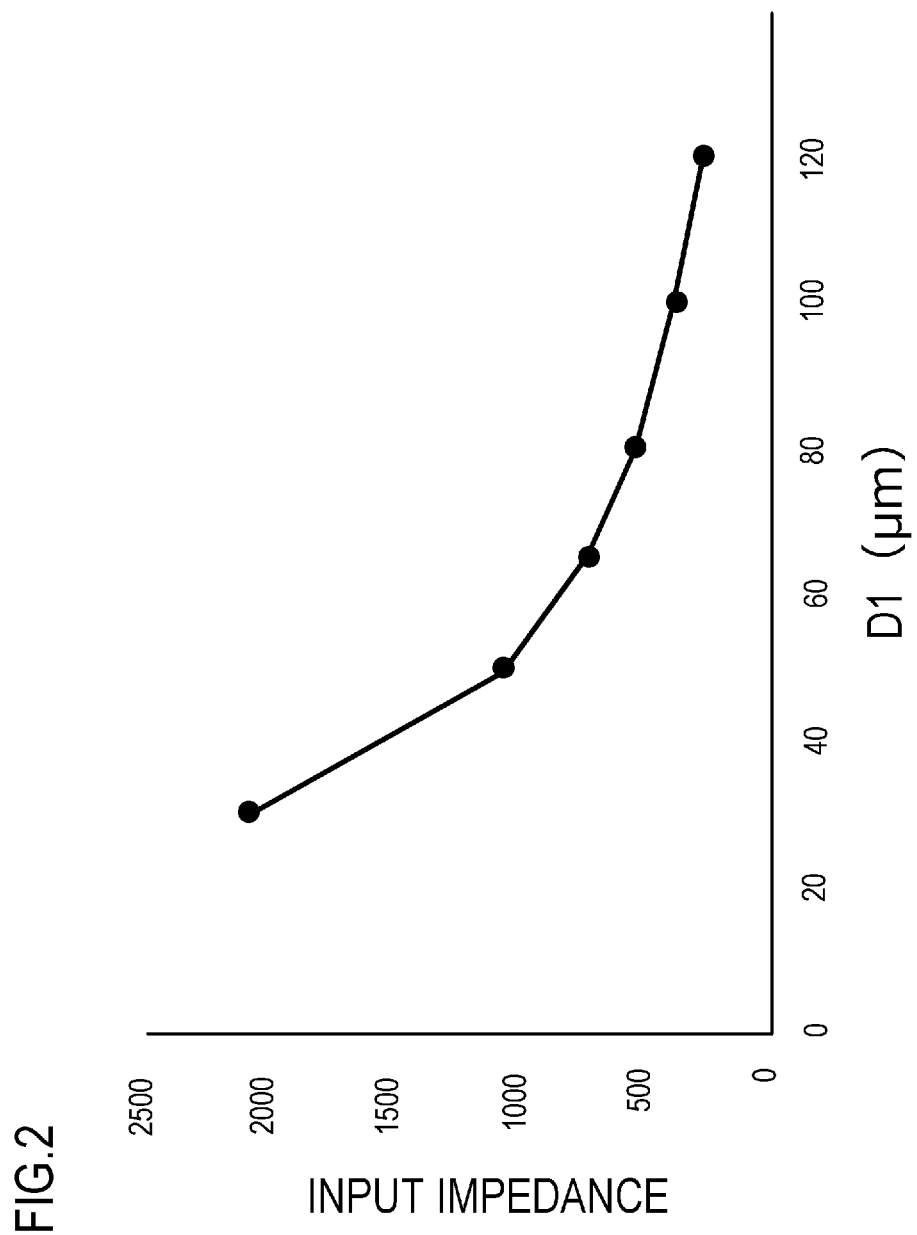
FIG. 2 is a diagram showing a relationship between a thickness of a cylindrical dielectric portion and input impedance according to the first embodiment.

FIG. 2 shows a relationship between the thickness D1 of the cylindrical dielectric portion 104 and the input impedance of the loop antenna 105 when an electromagnetic wave having an anti-resonant frequency with which the loop antenna 105 resonates is incident. In this case, the thickness D2 of the dielectric portion 103 is fixed to 20 μm. FIG. 2 reveals that, the larger the value of D1, the smaller the input impedance of the loop antenna 105. Therefore, by adjusting D1 to adjust the input impedance of the antenna, for example, impedances of the electron element 106 and the loop antenna 105 can be matched with each other. Performing such impedance matching enables reflection of a current between the electron element 106 and the loop antenna 105 to be suppressed.

Figure 3:
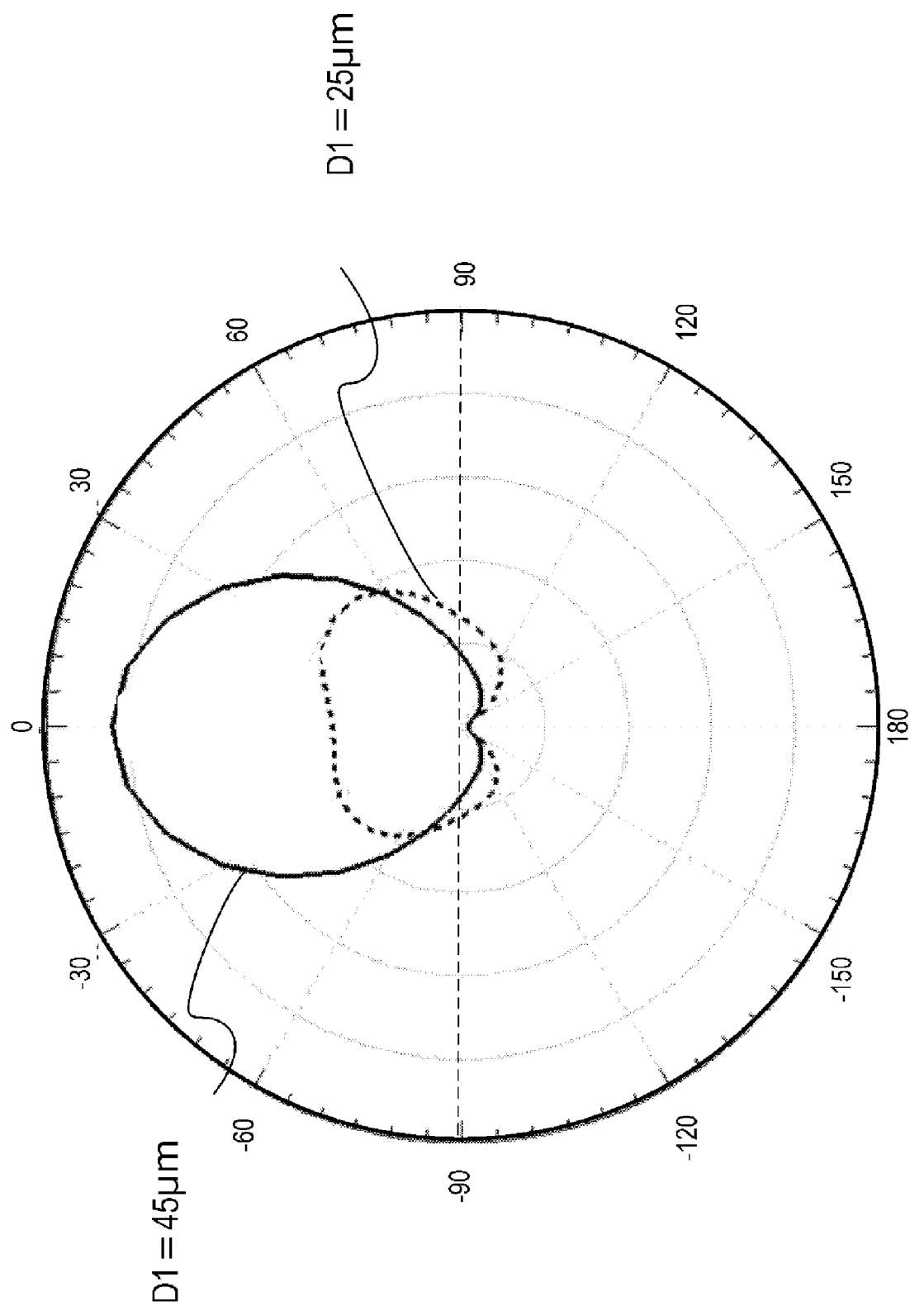
FIG. 3 is a diagram showing a thickness of the cylindrical dielectric portion and radiation patterns of an antenna according to the first embodiment.

FIG. 3 shows two radiation patterns of the loop antenna 105 (an electromagnetic wave) in a case where D1=45 μm and D2=20 μm and a case where D1=25 μm and D2=40 μm.

Specifically, in FIG. 3, the radiation pattern in the case where D1=45 µm and D2=20 µm is indicated by a bold line and the radiation pattern in the case where D1=25 µm and D2=40 µm is indicated by a dash line. It should be noted that, in FIG. 3, with a center of gravity (center) of the loop antenna 105 as an origin, an antenna-side normal direction with respect to the substrate 101 is assumed to be 0 degrees. In other words, in the present embodiment, 0 degrees refer to a direction from "the bottom" toward "the top". By reducing D2 with respect to D1 as described above, an antenna gain in the 0-degree direction improves and directionality of radiation of the electromagnetic wave increases. This reveals that, in cases where D=D1+D2=65 µm is the same, the directionality of radiation of an electromagnetic wave differs in accordance with a ratio of D1 and D2.

For example, when D=D1+D2 is fixed to 65 µm that is a same length as $\lambda_0/4$ and D2 is varied from 5 µm to 60 µm, a radiation angle of an electromagnetic wave widens and radiation of the electromagnetic wave into the substrate 101 gradually increases. When D2 is $\lambda_0/8$ or lower, there is hardly any radiation of an electromagnetic wave into the substrate 101.

In this manner, by changing the thickness D1 of the cylindrical dielectric portion 104 and the thickness D2 of the dielectric portion 103, the directionality of the antenna can be controlled.

First Modification Embodiment

While a detecting element having a basic configuration has been described in the first embodiment, a more practical detecting element will be described in the present modification embodiment. Specifically, in the present modification embodiment, a detecting element 200 which is suitable when disposing wiring that connects an outside of an antenna structure and a rectifying element with each other will be described. This is because, when disposing the antenna in an array, a signal readout circuit and the like are required.

Figure 4A:
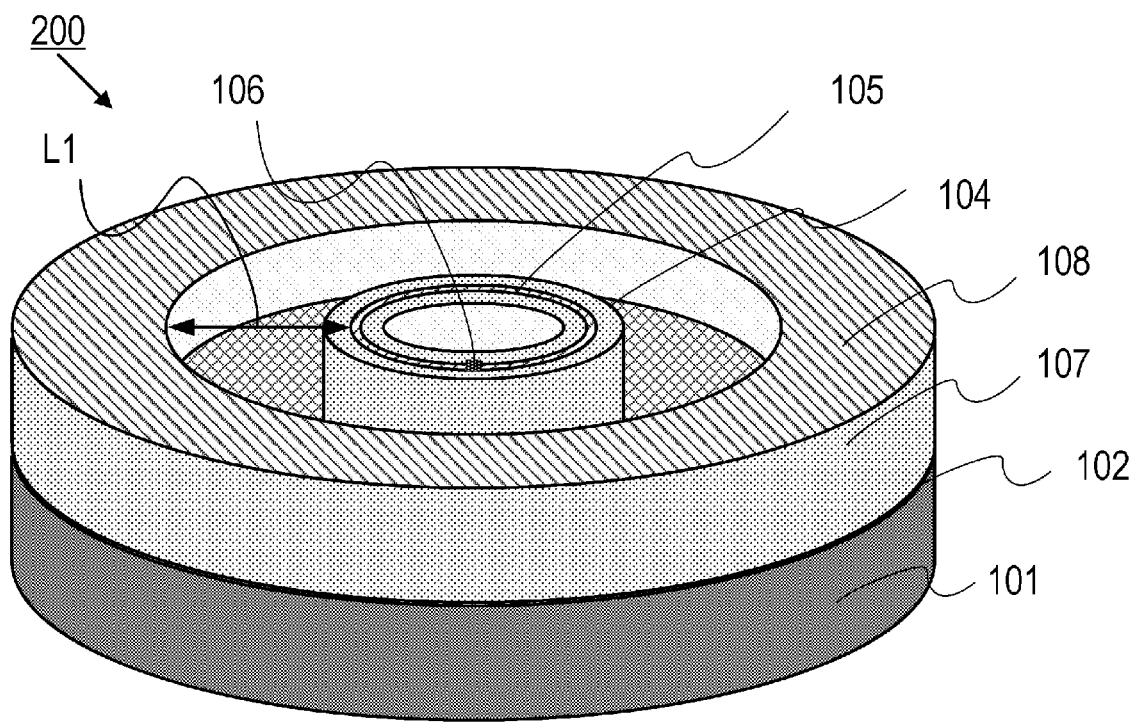
FIGS. 4A and 4B are diagrams showing a detecting element according to a first modification embodiment.
Figure 4B:
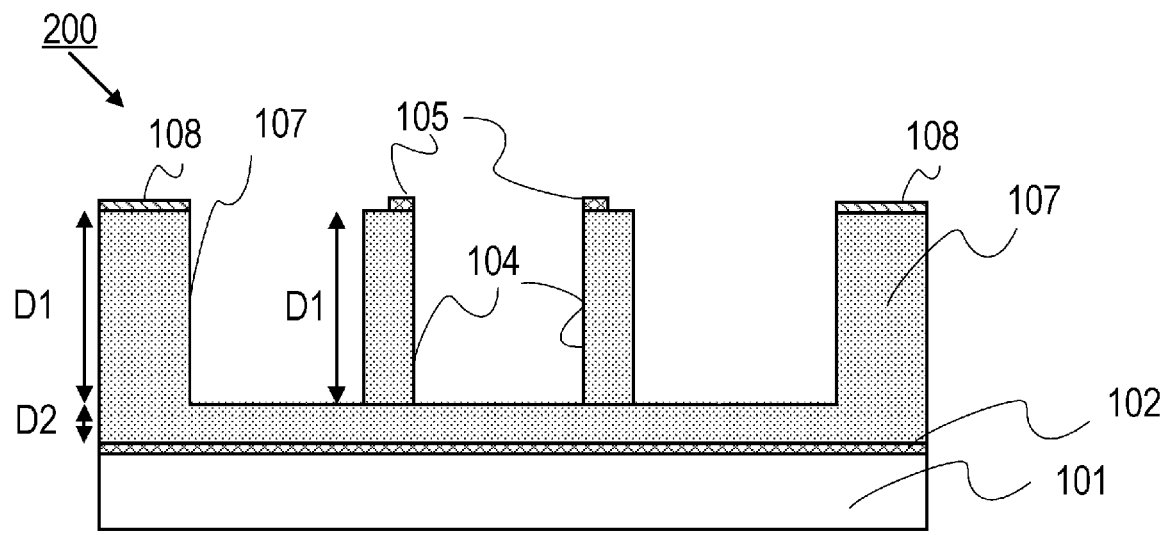

FIG. 4A is a bird's eye view showing an external appearance of the detecting element 200 according to the present embodiment. In addition, FIG. 4B is a sectional view of the detecting element 200 cut away in a perpendicular direction (vertical direction) with respect to a plane of the loop antenna 105 so as to pass through the center of gravity of the loop antenna 105. In a similar manner to the detecting element 100 according to the first embodiment, the detecting element 200 according to the present modification embodiment includes the substrate 101, the electrode portion 102, the loop antenna 105, and the electron element 106. On the other hand, the cylindrical dielectric portion 104 is connected to a second dielectric portion 107 instead of the dielectric portion 103. In addition, the detecting element 200 according to the present modification embodiment includes a second electrode portion 108 at a position separated from a loop-shaped portion of the loop antenna 105 by a certain distance.

As shown in FIGS. 4A and 4B, the second dielectric portion 107 undertakes a role of connecting the cylindrical dielectric portion 104 and the electrode portion 102 to each other in a similar manner to the dielectric portion 103 according to the first embodiment. In other words, the second dielectric portion 107 can be described as the dielectric portion 103 being changed (deformed) to a bottomed cylindrical shape so as to enclose the cylindrical dielectric portion 104. In this case, an outer portion of a bottom surface of the second dielectric portion 107 is bonded (joined) to the electrode portion 102. In addition, in the present modification embodiment, since a thickness of the second dielectric portion 107 is the same as the distance between the loop antenna 105 and the electrode portion 102, the thickness of the second dielectric portion 107 will be defined as D1+D2. It should be noted that D1 denotes the thickness of the cylindrical dielectric portion 104 in a similar manner to the first embodiment.

The second electrode portion 108 is formed (bonded) on an end surface on an opening side of the second dielectric portion 107 and suppresses disturbance of a radiation direction of an electromagnetic wave. Specifically, according to the second electrode portion 108, the radiation direction of an electromagnetic wave can be prevented from becoming a parallel direction with respect to the substrate 101.

An electromagnetic wave that resonates in the loop antenna 105 also forms an electric field in a surrounding space. Therefore, when installing a structure in an outer circumferential portion of the loop antenna 105, it is important that a behavior of the electromagnetic wave which resonates in the loop antenna 105 is not disturbed by the structure. In consideration thereof, in the present modification embodiment, the second dielectric portion 107 and the second electrode portion 108 must be separated from the loop-shaped portion of the loop antenna 105 by a certain distance or more in order to ensure that a state of the electric field spreading in the surrounding space is not disturbed.

FIG. 5 shows a relationship between a distance L1 between the loop-shaped portion of the loop antenna 105 and the second dielectric portion 107 and a radiated power of an electromagnetic wave in the loop antenna 105. Specifically, it is shown that the larger the value of an abscissa, the longer the distance L1, and the larger the value of an ordinate, the stronger the radiated power. It should be noted that radiated power is calculated in the present modification embodiment on the assumption that the frequency of an electromagnetic wave is 500 GHz in a similar manner to the first embodiment. As shown in FIG. 5, when the frequency of an electromagnetic wave is 500 GHz, radiated power of the electromagnetic wave abruptly declines when the distance L1 is reduced to less than 65 µm that is $\lambda_0/4$. Therefore, the distance L1 of separation between the loop antenna 105 and the second dielectric portion 107 desirably equals or exceeds $\lambda_0/4$. When the distance L1 is 32.5 µm that is $\lambda_0/8$, the radiated power of an electromagnetic wave is approximately ⅕ of the radiated power of an electromagnetic wave when the distance L1 is $\lambda_0/4$. Therefore, in cases where it is desirable to suppress the size of the detecting element 200 notwithstanding smaller radiated power of an electromagnetic wave, the distance L1 may be $\lambda_0/4$ or less and $\lambda_0/8$ or more.

Figure 6:
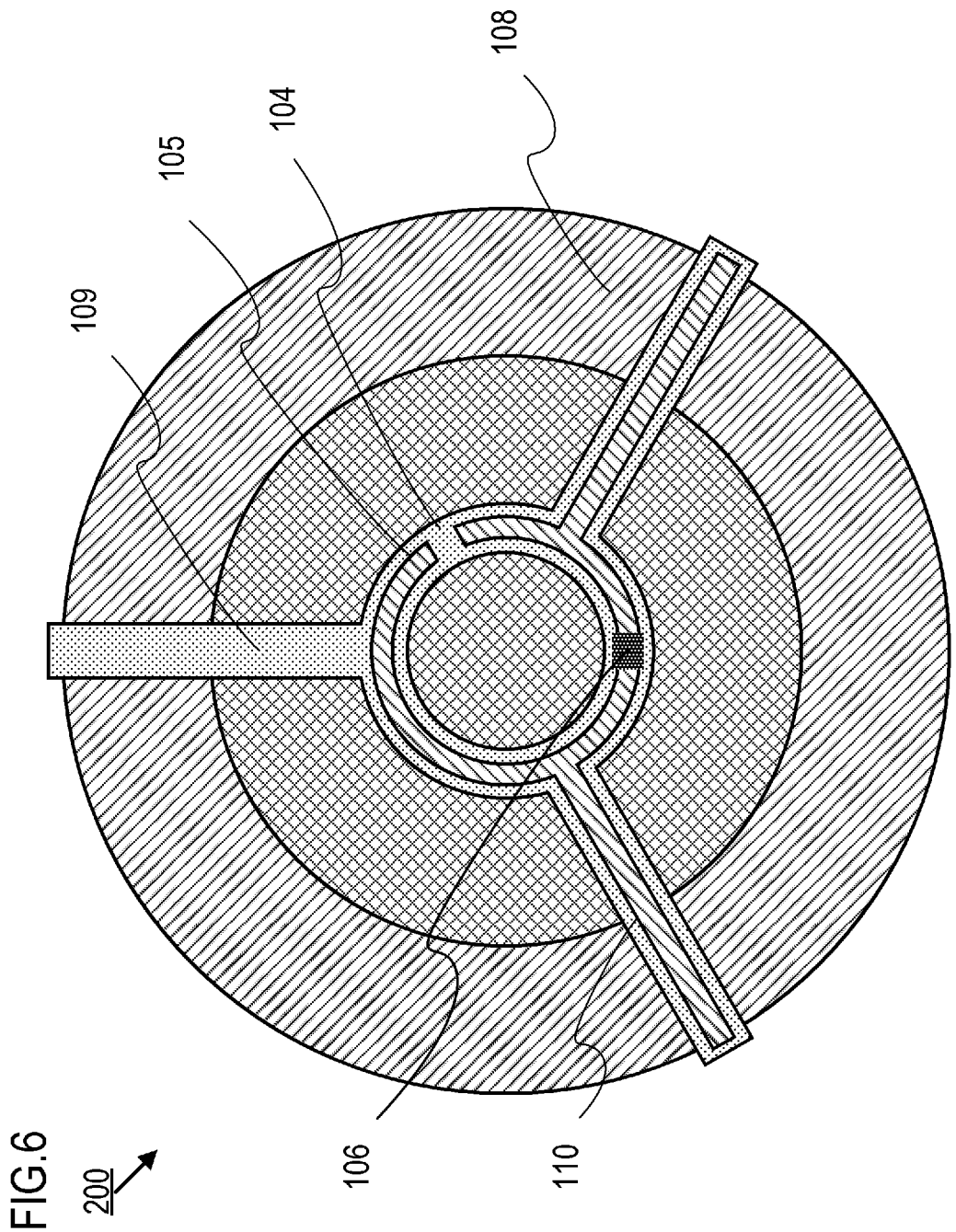
FIG. 6 is a diagram showing a detecting element having connecting dielectric portions according to the first modification embodiment.

In addition, the detecting element 200 may further include connecting wiring 110 which connects the loop antenna 105 and a signal readout circuit (not illustrated) to each other. FIG. 6 shows a diagram of the detecting element 200 including the connecting wiring 110 as viewed from a direction of incidence of an electromagnetic wave (upward direction). The connecting wiring 110 must be connected to a node of the electric field of the loop antenna 105 so as not to disturb a state of an electromagnetic wave that resonate in the loop antenna 105. In this case, a node of an electric field refers to a position where an electric field of the electromagnetic wave that resonates in the loop antenna 105 is minimized. In addition, in the present modification embodiment, a plurality of connecting dielectric portions 109 which connect the cylindrical dielectric portion 104 and the second dielectric portion 107 to each other are formed in order to support the connecting wiring 110.

Furthermore, in the present modification embodiment, the loop antenna 105 forms a structure in which an antenna with a length of $3\lambda_0/2$ is bent in a loop shape. More specifically, the loop antenna 105 is divided by the electron element 106 into lengths of $\lambda_0$ and $\lambda_0/2$, and the electron element 106 is connected to each section. Therefore, the connecting dielectric portions 109 and the connecting wiring 110 are installed at a node of the electric field of the electromagnetic wave that resonates in each section of the divided loop antenna 105. It should be noted that the connecting dielectric portions 109 and the connecting wiring 110 can be simultaneously formed with the loop antenna 105 and the cylindrical dielectric portion 104. By installing the connecting dielectric portions 109 in this manner, power feeding wiring for supplying power to the loop antenna 105 and signal output wiring for acquiring (fetching) a signal output by the loop antenna 105 can be used as the connecting wiring 110. In other words, for example, the power feeding wiring can be disposed on one connecting dielectric portion 109 and the signal output wiring can be disposed on another connecting dielectric portion 109. In addition, since the connecting wiring 110 is formed on the connecting dielectric portions 109, a disconnection in the wiring due to a difference in level can be prevented.

Figure 7:
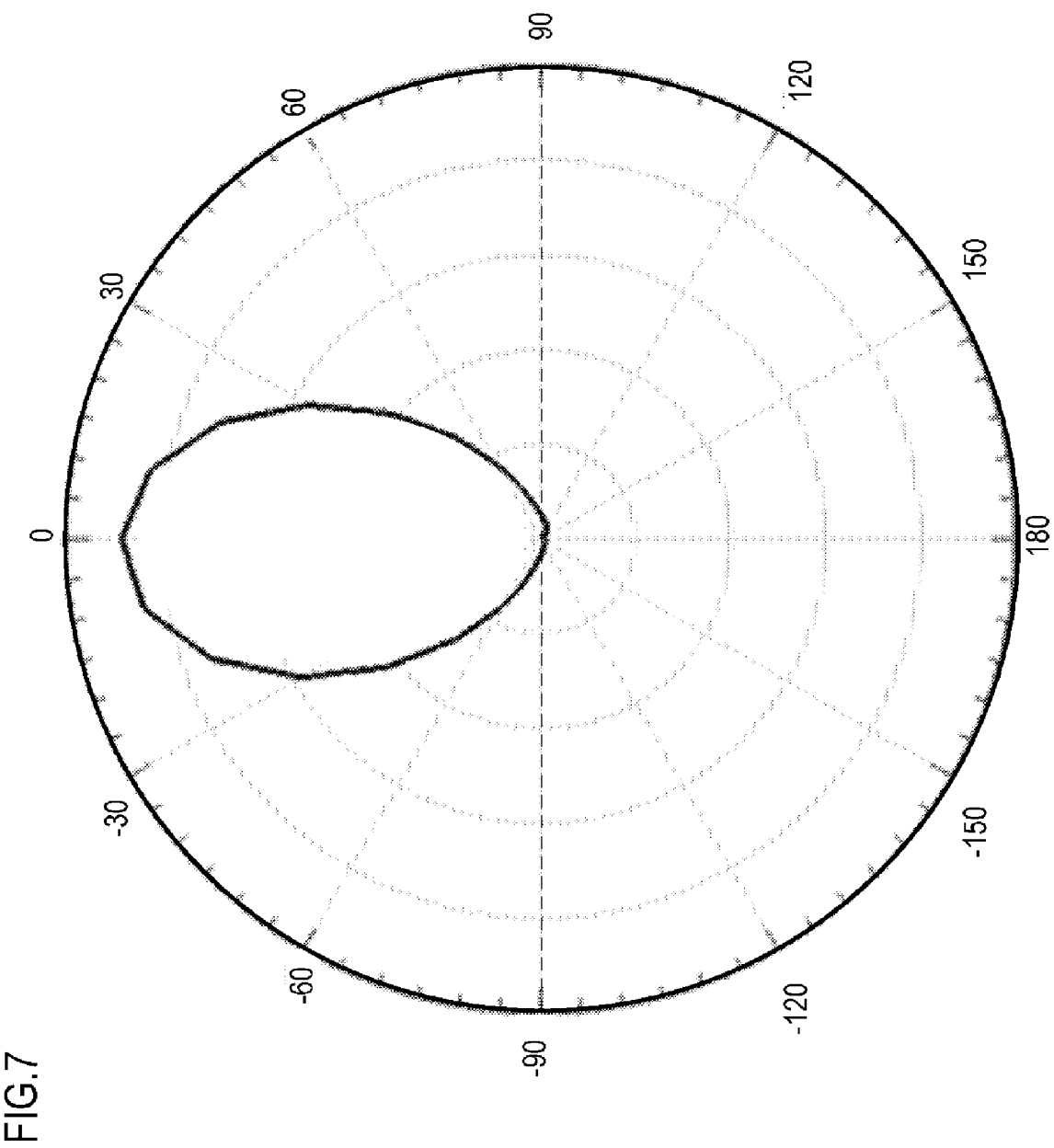
FIG. 7 is a diagram showing a radiation pattern of an antenna according to the first modification embodiment.

With the detecting element 200 which includes the second dielectric portion 107 and in which the distance L1 between the second dielectric portion 107 and the loop-shaped portion of the loop antenna 105 is $\lambda_0/4$ or more as described above, a radiation pattern of the loop antenna 105 (an electromagnetic wave) is not disturbed. FIG. 7 shows a radiation pattern of the loop antenna 105 of the detecting element 200 in which the thickness D1 of the cylindrical dielectric portion 104 is 45 μm, the distance between the loop antenna 105 and the electrode portion 102 is 20 μm, the distance L1 is 65 μm, and the connecting wiring 110 is disposed as described above. In other words, with the configuration of the detecting element 200 according to the present modification embodiment, the directionality of the antenna is not disturbed by the connecting wiring 110 as shown in FIG. 7. Therefore, according to the present modification embodiment, a decline in receiving sensitivity of an electromagnetic wave can be suppressed even in a semiconductor element that includes the connecting wiring 110 which connects the loop antenna 105 and a signal readout circuit (not illustrated) to each other.

Fabrication (Manufacturing; Generation) Method of Detecting Element

Figure 8:
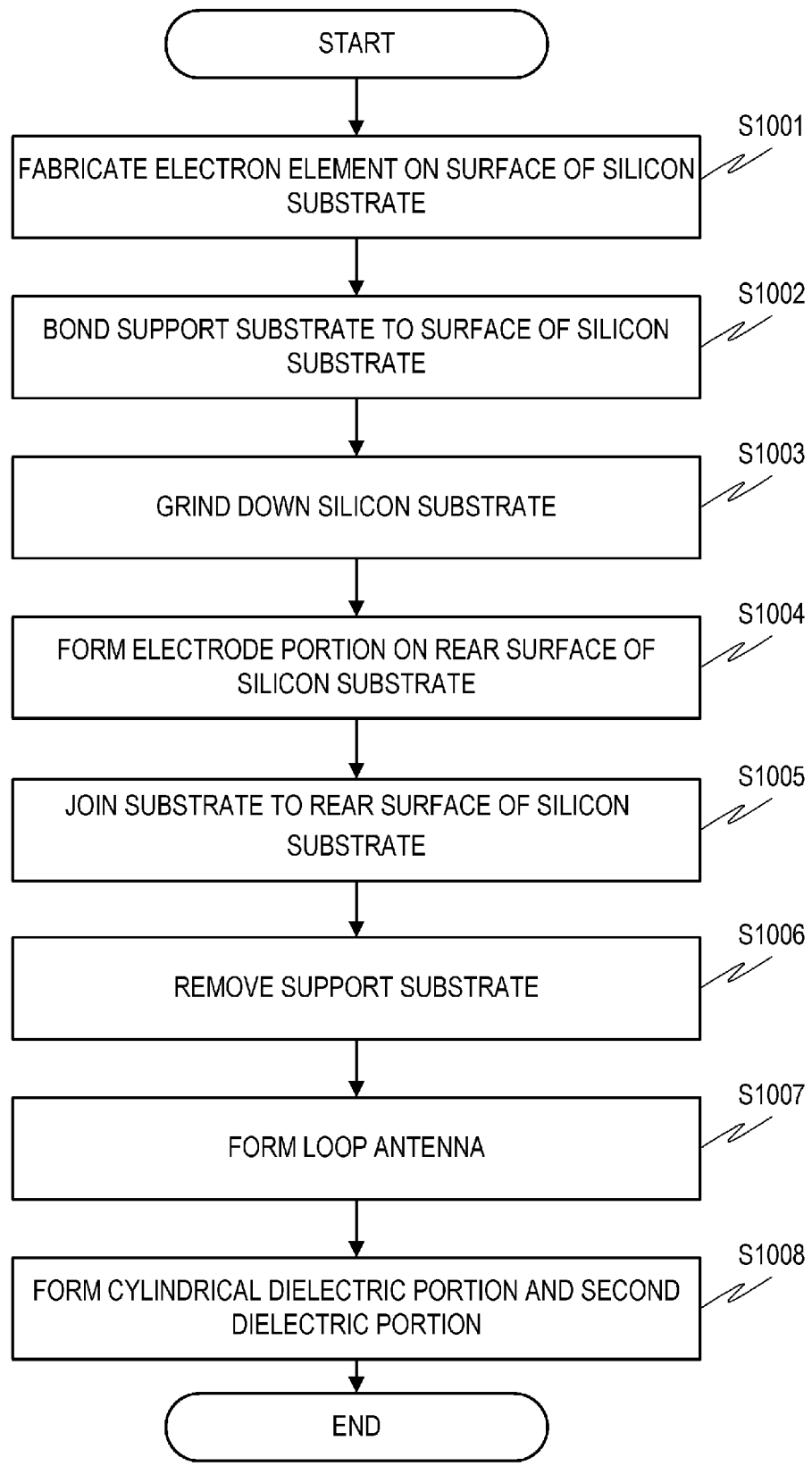
FIG. 8 is a flow chart showing a fabrication process of the detecting element according to the first modification embodiment.

Next, a fabrication method (a generation method; a manufacturing method) of the detecting element 200 according to the first modification embodiment will be described with reference to a flow chart showing a fabrication process in FIG. 8 as well as FIGS. 9A to 9D and FIGS. 10A to 10D. FIGS. 9A to 9D and FIGS. 10A to 10D each show a bird's eye view of the detecting element 200 in each fabrication process. It should be noted that, while the following fabrication method will be described on the assumption that the method is to be carried out by a human fabricator, alternatively, a machine such as a forming apparatus may perform the fabrication.

Figure 9A:
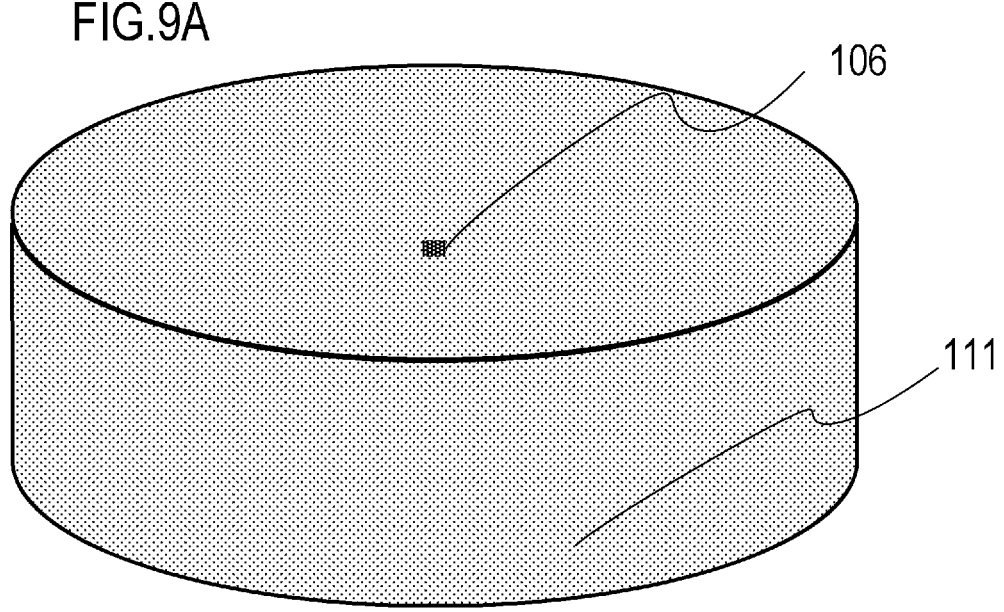
FIGS. 9A to 9D are diagrams showing the detecting element in each fabrication step according to the first modification embodiment.

In S1001, as shown in FIG. 9A, a Schottky barrier diode as the electron element 106 having (including) rectifying characteristics is fabricated on a surface (a first surface) of a silicon substrate 111 that is a semiconductor substrate by a known semiconductor element process. In this case, a semiconductor substrate made of Si, GaAs, or InP may be used instead of the silicon substrate 111.

Figure 9B:
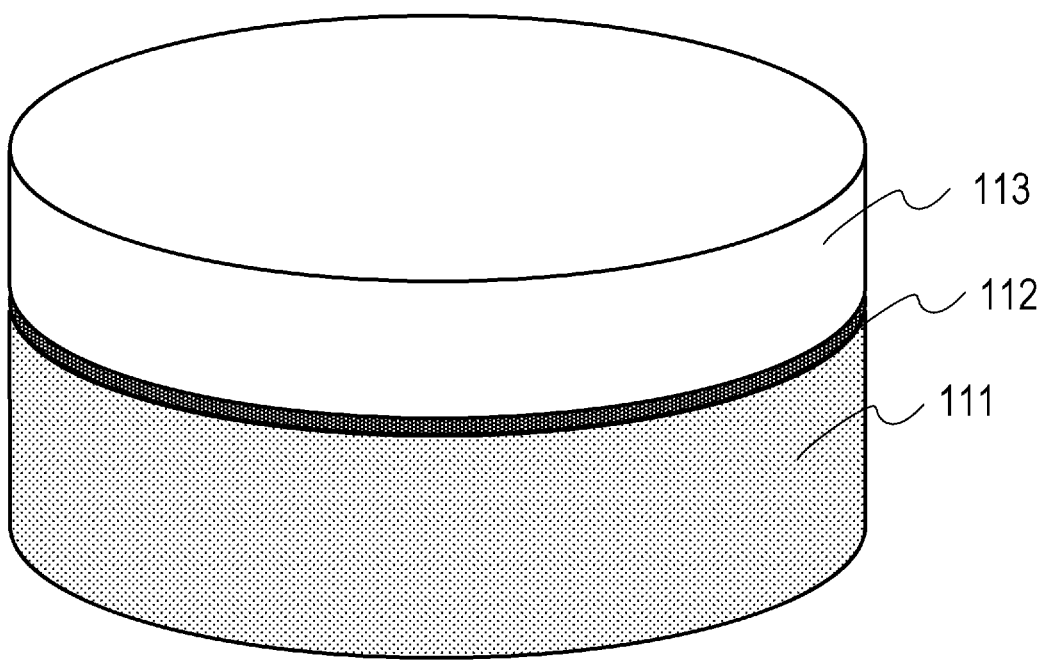

In S1002, as shown in FIG. 9B, in order to thin down the silicon substrate 111, an adhesive 112 for temporary fixing is applied to the surface of the silicon substrate 111 and the silicon substrate 111 and a support substrate 113 are bonded to each other.

Figure 9C:
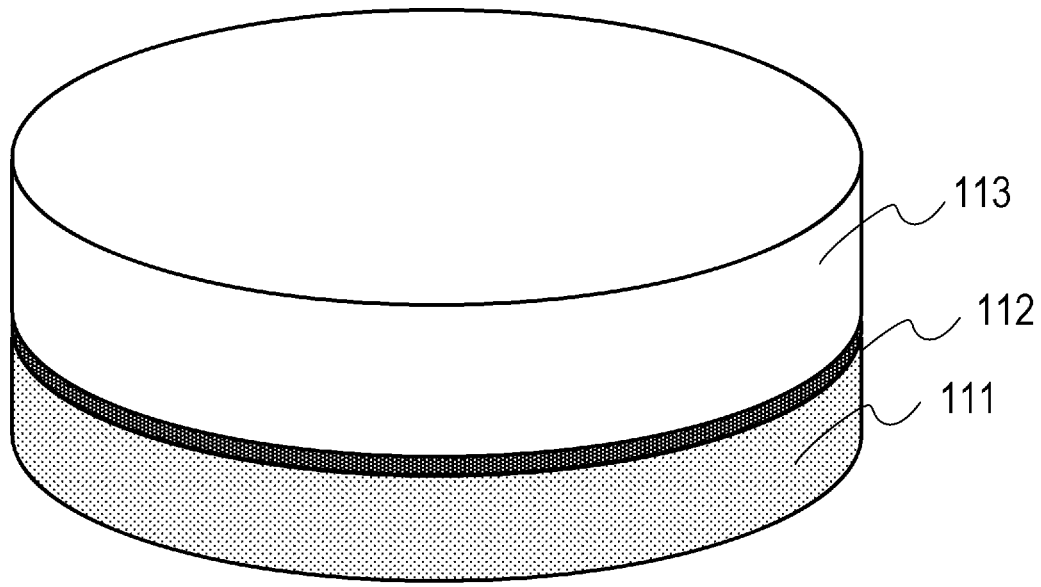

In S1003, as shown in FIG. 9C, a rear surface (a second surface) of the silicon substrate 111 is ground to a specified thickness by a back grinding apparatus or the like. In the present modification embodiment, grinding is performed so that the thickness of the silicon substrate 111 is reduced to $\lambda_0/4=65$ μm. It should be noted that the thickness of the silicon substrate 111 need not necessarily be $\lambda_0/4$ and need only be $\lambda_0/8$ or more.

Figure 9D:
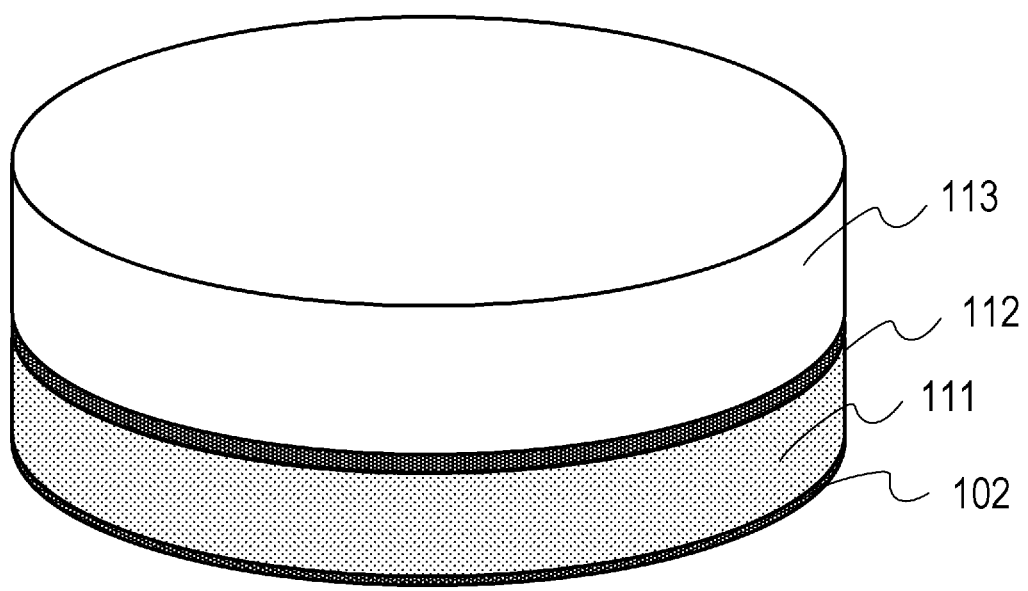

In S1004, as shown in FIG. 9D, a metal reflective film with high conductivity such as a stacked film of aluminum and titanium is formed by a sputtering apparatus or the like as the electrode portion 102 on the rear surface of the silicon substrate 111. In doing so, silicon dioxide is formed by plasma CVD or the like as a protective film and a film for bonding in the electrode portion 102. An insulating material such as SiN or SiON may be used instead of silicon dioxide.

Figure 10A:
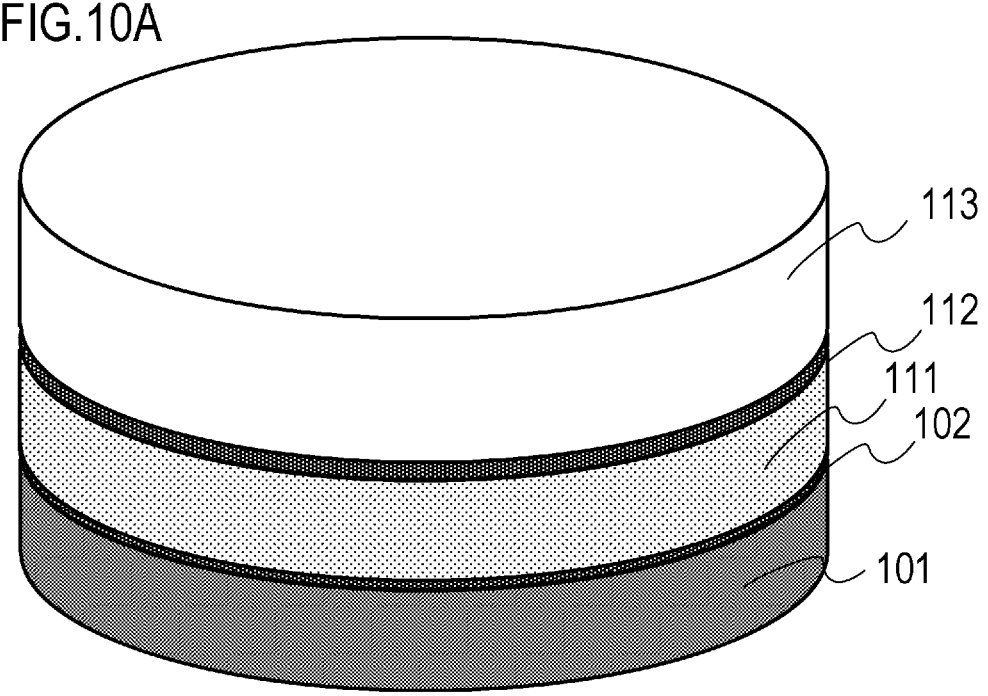
FIGS. 10A to 10D are diagrams each showing the detecting element in each fabrication step according to the first modification embodiment.

In S1005, as shown in FIG. 10A, a silicon substrate, a silicon substrate on which a silicon dioxide film is formed, or a substrate made of glass, quartz, or the like is prepared as the substrate 101. At this point, by using a silicon substrate on which a readout circuit or the like is formed as the substrate 101, connecting the substrate 101 and the electron element 106 to each other enables a signal to be read out. In addition, a surface (a first surface) of the substrate 101 and the rear surface of the silicon substrate 111 are bonded to each other so as to sandwich the electrode portion 102. It should be noted that the bonding may be direct bonding of SiO—SiO, SiO—Si, or the like, metal-metal bonding which forms a metal film on a connecting surface, or bonding by an adhesive. Alternatively, a bump (a connecting electrode) may be used to provide both bonding and wiring connection. In other words, in S1005, the substrate 101 is bonded to a surface on an opposite side to a surface of the electrode portion 102 being bonded to the silicon substrate 111.

Figure 10B:
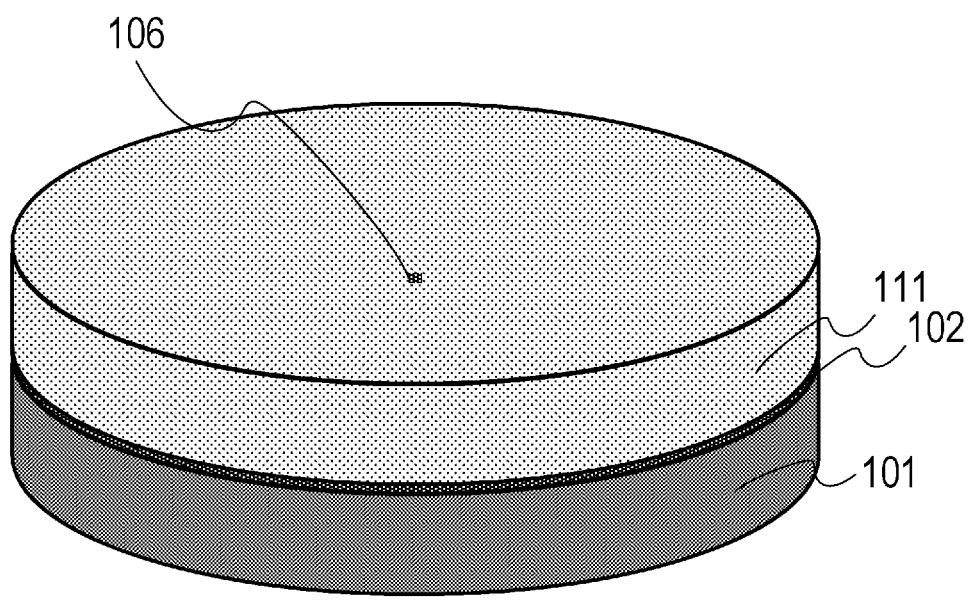

In S1006, as shown in FIG. 10B, the support substrate 113 and the adhesive 112 for temporary fixing are removed (peeled off) from the detecting element 200.

Figure 10C:
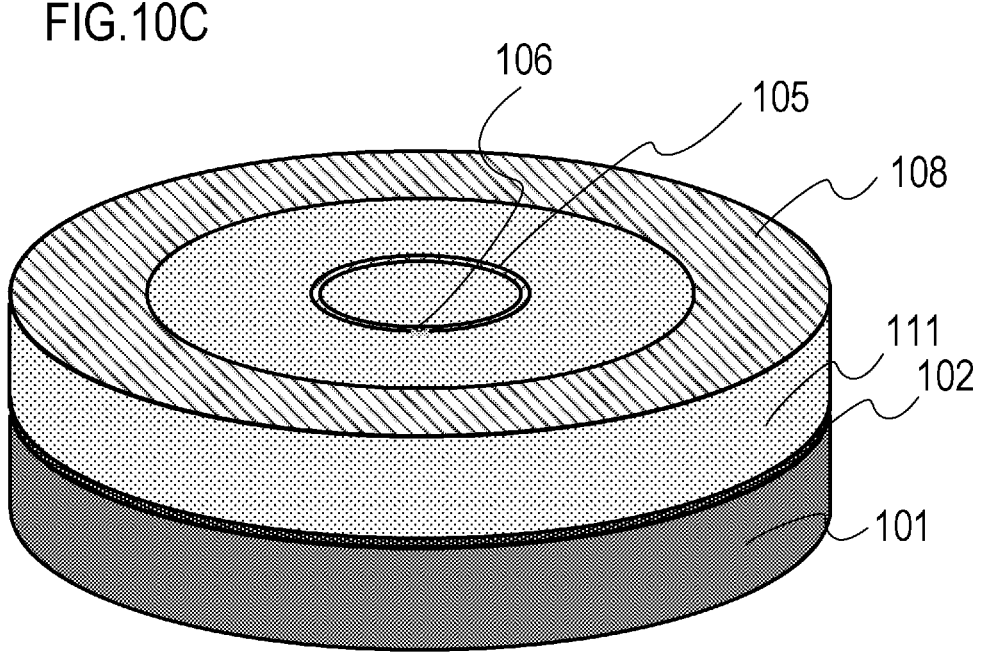

In S1007, as shown in FIG. 10C, the loop antenna 105 is formed by sputtering, a photolithography process, or the like on an electrode of the Schottky barrier diode and the electron element 106 and the loop antenna 105 are electrically connected to each other. In other words, the loop antenna 105 is formed on the surface of the silicon substrate 111. At this point, the second electrode portion 108 may be fabricated using a same material as the electrode portion 102. In addition, the connecting dielectric portions 109 and the connecting wiring 110 may also be fabricated in S1007.

Figure 10D:
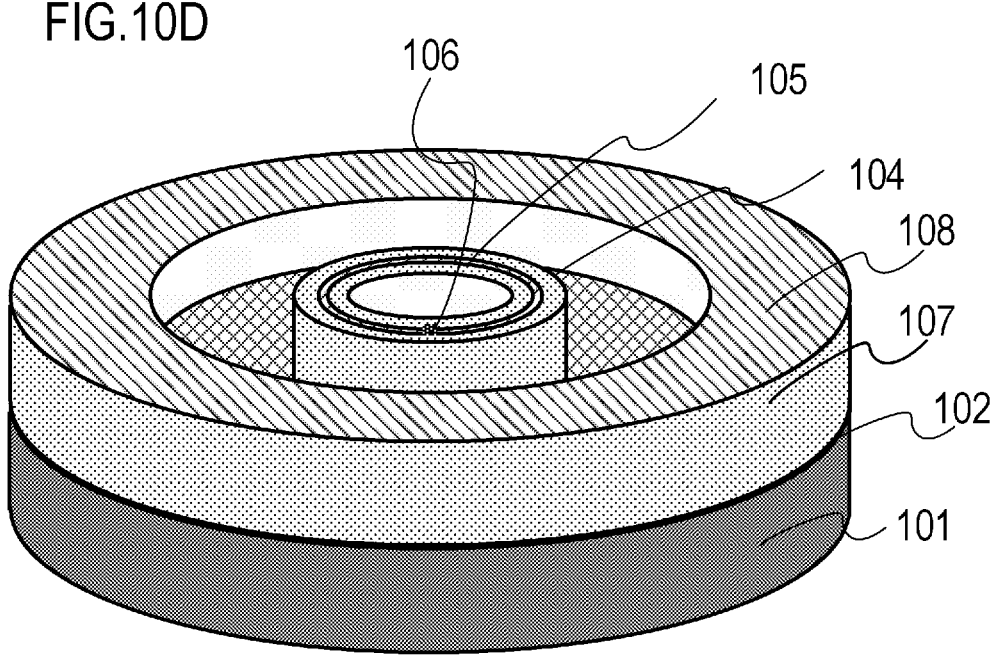

In S1008, as shown in FIG. 10D, the cylindrical dielectric portion 104 and the second dielectric portion 107 are formed by machining the silicon substrate 111 in a photolithography process and an etching process by a Bosch process. In other words, the cylindrical dielectric portion 104 and the second dielectric portion 107 are fabricated by removing a part of the silicon substrate 111. The thickness D1 of the cylindrical dielectric portion 104 in the present modification embodiment is 45 μm. A dielectric portion need not be fabricated in a semi-cylindrical shape as in the case of the second dielectric portion 107 and may be fabricated in a columnar shape as in the case of the dielectric portion 103. In other words, the detecting element 100 according to the first embodiment can be fabricated by changing a portion to be machined of the silicon substrate 111.

Since an antenna without a resin backfill process can be fabricated by forming a loop antenna and a cylindrical dielectric portion as described above, a detecting element can be simply (readily) fabricated. In addition, since a radiation pattern of the antenna is shaped by a cylindrical dielectric body and an electrode portion (a reflective plate) disposed at a suitable position, propagation of an electromagnetic wave into a substrate can be reduced.

Furthermore, by using an electron element that oscillates an electromagnetic wave as the electron element 106, the detecting element 100 according to the embodiment described above and the detecting element 200 according to the modification embodiment described above can be converted into an oscillating element (an oscillator) which oscillates an electromagnetic wave in the terahertz region. In other words, the embodiment and the modification embodiment described above are applicable to elements which oscillate or receive an electromagnetic wave. A fabrication method (a manufacturing method) of the oscillating element is similar to the manufacturing method of the receiving element described above. In addition, even in a mode of an oscillating element, the problem of the present invention can be solved since there is no need to fill a depressed portion with a resin as is the case described in Japanese Patent Application Laid-open No. 2017-44696.

It should be noted that, for example, the present invention is also applicable to a program that enables a forming apparatus or a computer to execute the fabrication method of a detecting element described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161424, filed on Aug. 30, 2018, which is hereby incorporated by reference herein in its entirety.

What is claimed is:

1. An element configured to oscillate or detect an electromagnetic wave, the element comprising:
a first dielectric portion having cylindrical shape and including a loop antenna on a first end surface thereof;
a second dielectric portion connected to a second end surface of the first dielectric portion which is different from the first end surface; and
an electrode portion which is disposed between the second dielectric portion and a substrate and is configured to reflect the electromagnetic wave.

2. The element according to claim 1, further comprising, on the first end surface of the first dielectric portion, an electron element which is electrically connected to the loop antenna.

3. The element according to claim 1, wherein the first dielectric portion and the second dielectric portion are semiconductors made of Si, GaAs, or InP.

4. The element according to claim 1, wherein a thickness of the first dielectric portion is 1/8 or more of a wavelength at which the electromagnetic wave propagates through the loop antenna.

5. The element according to claim 1, wherein a distance between the first dielectric portion and the electrode portion is 1/8 or less of a wavelength at which the electromagnetic wave propagates through the loop antenna.

6. The element according to claim 1, wherein a distance between the loop antenna and the electrode portion is 1/8 or more of a wavelength at which the electromagnetic wave propagates through the loop antenna.

7. The element according to claim 6, wherein the distance between the loop antenna and the electrode portion is 1/4 of the wavelength at which the electromagnetic wave propagates through the loop antenna.

8. The element according to claim 1, wherein the second dielectric portion has a bottomed cylindrical shape, and an outer side of a bottom surface is bonded to the electrode portion and disposed so as to surround the first dielectric portion.

9. The element according to claim 8, comprising a second electrode portion which is bonded to an opening-side end surface of the second dielectric portion.

10. The element according to claim 8, wherein a distance between the loop antenna and the end surface of the second dielectric portion is 1/8 or more of a wavelength at which the electromagnetic wave propagates through the loop antenna.

11. The element according to claim 8, further comprising:
a feeding wiring for supplying power to the loop antenna;
a signal output wiring for acquiring a signal output by the loop antenna; and
a plurality of connecting dielectric portions for supporting the feeding wiring or the signal output wiring, the plurality of connecting dielectric portions bonding the first dielectric portion and the second dielectric portion to each other, wherein
the feeding wiring and the signal output wiring are connected to a position where an electric field of the electromagnetic wave in the loop antenna is minimized.

12. The element according to claim 1, wherein the electromagnetic wave is an electromagnetic wave with a frequency included in a range of 30 GHz to 30 THz.

13. A manufacturing method of an element for oscillating or detecting an electromagnetic wave, the manufacturing method comprising:
a step of fabricating an electron element on a first surface of a semiconductor substrate;
a step of forming an electrode portion on a second surface of the semiconductor substrate, the second surface being an opposite surface to the first surface;
a step of bonding a substrate that differs from the semiconductor substrate onto a surface of the electrode portion, the surface being opposite to a surface bonded to the semiconductor substrate;
a step of forming, on the first surface of the semiconductor substrate, a loop antenna that is to be electrically connected to the electron element; and
a step of forming, by etching the semiconductor substrate, a first dielectric portion having cylindrical shape and including the loop antenna on a first end surface and a second dielectric portion connected to a second end surface of the first dielectric portion which is different from the first end surface.

14. The manufacturing method according to claim 13, further comprising a step of grinding, before the step of forming the electrode portion, the semiconductor substrate so as to reduce a thickness of the semiconductor substrate to 1/4 of a wavelength at which the electromagnetic wave propagates through the loop antenna.

* * * * *